United States Patent Office 3,362,472
Patented Jan. 9, 1968

3,362,472
AQUEOUS FLOODING METHOD UTILIZING HUMIC ACID
Heino Purre, Bartlesville, Okla., assignor to Phillips Petroleum Company, a corporation of Delaware
No Drawing. Filed Mar. 28, 1966, Ser. No. 537,640
4 Claims. (Cl. 166—9)

This invention relates to the recovery of hydrocarbons from depleted oil fields, and pertains more particularly to improved methods of flooding such sands to effect an effective and efficient secondary or tertiary recovery of oil therefrom.

It is well known that the so-called primary recovery techniques, which include natural flow, gas-lifting and pumping techniques, recover only a minor portion of the oil present in a given oil-bearing earth formation. Even the use of improved primary recovery practices, e.g., use of gas repressuring treatments, and the like, still leaves major quantities of oil, some of which may be adhering to the particles of sand or the particles of oliferous structure, trapped in pores by capillary and hydrodynamic forces, etc.

For this reason, there is a great deal of interest in the so-called secondary recovery techniques, the use of which permits the recovery from the partially-depleted formation of additional quantities of oil present therein. These secondary recovery techniques, in general, all utilize the principle of augmenting the remaining reservoir pressure after it has been depleted during oil recovery by the aforementioned primary recovery methods. This reservoir energy augmentation is effected by providing, e.g., by drilling, one or more injection wells extending downwardly into a permeable oil formation within suitable proximity to a producing well or wells which have been drilled into this same permeable oil-bearing formation, a liquid or a gas, or mixtures thereof, being injected through the above-mentioned injection well to drive the oil to and thus increase the oil production from the producing well or wells.

Water is one of the practical fluids which has been generally used for the augmentation of depleted reservoir energy. In this general method, which is normally described as "water-flooding," water is pumped through an injection well and into the permeable partially-depleted oil-bearing formation, this water driving the oil from the zone near the injection well or wells towards the producing wells.

Since at least a portion of the oil remaining in a permeable oil-bearing formation after it has been partially depleted by use of the so-called primary recovery techniques, is relatively tightly bound or adhering to the particles of the oil-bearing structure, it is frequently desirable, if not essential, to use surface interface tension reducing and/or capillary active agents; these have been proposed and sometimes used as addition agents to the flooding-water in an attempt to increase the efficiency of the water-flood.

Although frequently technical benefits are obtained from the use of these surfactants in flood-waters, there is at least one major objection, and that is the excessive cost. Thus, although the concentration of these surface interface tension reducing (i.e., wetting and/or emulsifying) agents in the water is quite low, e.g., in the order of between about 0.1 percent and about 3 percent to about 4 percent (or even somewhat higher) the total amount of the additive or additives employed in a given-water-flood operation is quite high because of the very large total amount of water which has to be and is introduced into a given partially-depleted oil-bearing formation treated by the water-flood technique. This raises the cost of secondary recovery to a figure which is sometimes exorbitant and frequently even uneconomical because of the relatively high price of the surfactant, particularly when the total cost thereof per water-flood operation is compared with the amount of oil recovered by the use of this technique.

It is therefore an object of this invention to avoid the above and other defects of the prior art, and to provide an efficient and economical water-flood method or techniques.

It is a further object to provide a water-flood operation in which the surfactant or wetting agent is formed in situ.

Accordingly, it is an object of this invention to provide an improved process for the recovery of oil from subterranean formations.

A further object is to provide an economical process for reversing the wettability characteristics of oil producing formations.

Other objects, advantages and features of the invention should become apparent from the following detailed description.

In accordance with the present invention, I have now discovered an improved water-flooding process as achieved by the addition of humic acids to the flood medium, preferably water.

In one specific embodiment of this invention, water which has a pH greater than seven is first introduced into a locus containing humic acids so as to generate in situ the surfactants containing flood-water which, in turn, is then employed as the flooding medium in conventional secondary recovery processes.

In another embodiment of this invention the flood-water is treated by mixing the humic acid therein prior to its introduction into the well.

In a further embodiment of the invention, the flood-water is preconditioned so as to achieve generation of humic acid in situ from the formation being flooded. This aspect necessarily is predicated on the formation having present therein deposits of the necessary humic acid-containing materials.

By the utilization of humic acids in accordance with this invention, not only is the wettability characteristics of the oil producing reservoir changed and the oil production advantages recognized to result from this change achieved, there is also achieved the advantage that it reduces surface tension effects and increases the viscosity of the water assisting in the displacement of the oil.

As is common with the use of surfactants, the percentage addition to the water-flood medium will be in the range of 0.1 to 4 percent, preferably 0.5 to 1.0 percent.

Humic acid is a material of wide distribution, being present in soils, peat, and coals, especially coals of the type known as lignite or brown coal. Although the exact details of its chemical structure are not completely known, it is a surprisingly uniform substance considering the variety of source materials of which it represents a natural product of degradation, such as leaves, wood, and like vegetable organic matter. It is an acid, in which both carboxyl and phenolic hydroxyl groups contribute base-combining ability. It is soluble in alkalies, such as caustic soda and sodium carbonate, has a deep brown color, and is readily soluble in water when converted to its alkali metal salt, which may be then termed an alkali metal humate, the commonest example of which is sodium humate.

As indicated, it is present in soils and peat, and may readily be extracted from these by known means, most commonly by treatment with dilute aqueous alkali. Whenever it is a matter of producing a commercial humate, that is, whenever economic considerations are of importance, then the humic acid is nearly always derived from its richest common source, which is lignite, of which there are vast deposits distributed throughout the world, including the United States, and particularly the States of North Dakota, Texas, New Mexico, and California.

Humic acid also possesses the possibility of being generated in situ where fragmentary or larger amounts of coal, kerogen, or other rocks containing other fossil organic matter are present in the formations.

The leaching of humic acids from fossil matter in reservoir rock can be done in basic, neutral or acid media depending on the composition of the reservoir rock.

The solvents for basic media (pH 7 and higher) are as follows: $NaOH$, $KOH$, $NH_4OH$, $Ba(OH)_2$, $Na_2B_4O_7$, $K_2CO_3$, $Na_2CO_3$, $CH_3COONa$, $Na_2HPO_4$, $C_5H_5N$, $[N(CH_2.CH_2.OH)_3]$, and the like.

The solvents for neutral media (pH 7) are as follows: $NaF$, $NH_4F$, $(NH_4)_2HPO_4$, $(COO)_2.Na$, $(COO)_2.K_2$, $(COO)_2.(NH_4)_2$, $C_4H_4O_6.(NH_4)_2$, $OH.C_6H_4.COONa$, $COONa.CH_3.C(OH)—COONa).CH_2.COONa$ $(CH_2)_6.N_4$, $CO(NH_2)_2$, and the like.

The solvents for acid media (pH 7 and less) are as follows: $CH_3COOH$, $COOH—CH_2.C(OH).(COOH).CH_2.COOH$
$COOH.CHOH.CHOH.COOH$, $C_6H_5.COOH$ $OH.C_6H_4.COOH$, and the like.

Another advantage achieved by the instant invention is the avoidance of the defect of water drive or water-flooding referred to in the art as "fingering"; that is, by-passing of some of the oil in the formation, particularly that which is present in some of the denser or relatively less porous portions of the formation. This fingering or by-passing may be prevented, or at least materially inhibited, by adjusting the viscosity of the aqueous solution by means of the humic acid additive.

Substantially all oil-bearing formations contain coaly materials, the extent and type depending on the original composition and the metamorphic activity to which the formation has been subjected. If the formation has as low as 1.0 percent of semibituminous or lignite rank classification of coal present in situ leaching of humic acid can be accomplished with satisfactory results. The coaly material present in the formation may be either distributed uniformly throughout such as in the Burbank field or like the Oficina formation in the Morichal field, Monagas State, Venezuela, where coals are distributed in seams ranging from a few inches to a few feet thick throughout the producing formation. In areas where the coaly material is insufficient for in situ leaching, there are generally coal beds over or underlaying the producing formation that can be utilized for the production of the humic acid, such as in the south and southwest portions of the United States. Where none is present, the base material can be shipped in for manufacture of humic acid.

In the following examples which are presented to further illustrate the invention there are illustrated the three potential methods of preparing the humic acid. The formations have been subjected to water-flooding for a number of years and, in some instances, the water-oil producing ratio has exceeded 100:1. The water being injected shows neutral characteristics. Wells are based on 4-acre spacing with a producing formation of 50 feet having an average of 40 percent residual oil and 25 percent porosity.

*Example I*

In a production formation having from 1.0 to 20 percent material present which is convertible to humic acid uniformly distributed throughout the formation, and a residual oil content of 40 percent, there is injected at least 7140 pounds of sodium hydroxide so as to achieve a minimum concentration of 0.1 percent humic acid for each 40 acres to be flooded with surfactant. The caustic is metered into the flood-water to produce an approximate 1–2 percent solution. This creates conditions within the formation which will allow maximum humic acid generation while avoiding excessive well equipment corrosion. By utilizing the in situ generation of humic acid surfactant in the formation, approximately 10 percent of the 40 percent residual oil is recovered. This process has the additional advantage that only a minimum increase in recovery cost is experienced.

*Example II*

In a production formation having a residual oil content of 40 percent and an overlay of a coal formation, 7140 pounds of sodium hydroxide are metered into the injection flood-water so as to provide a caustic solution having a concentration of 1–2 percent and a pH of about 10 to 14. The thus prepared caustic solution is introduced first into the coal overlay wherein the humic acid content is leached therefrom at such a rate that the flood-water removed from the coal overlay has a humic acid content of 0.01 percent. The surfactant containing flood-water is thereafter introduced into the oil-bearing formation with a resultant recovery of about 10 percent of the residual oil therein.

*Example III*

Coal fines having a mesh size of $-20$ to $-10$ are shipped to the vicinity of the injection well for an oil-bearing formation containing 40 percent residual oil therein. The coal fines are subjected to above ground leaching by contacting with caustic leach water formed by admixing sodium hydroxide and water so that the resulting mixing solution has a pH of about 10–14. The resulting solution of water and humic acid surfactant having a humic acid content of 0.01 percent is metered into the flood-water so as to provide a concentration of 0.01 percent of surfactant in the flood-water as it is introduced into the formation. By operating the secondary recovery operation in otherwise conventional manner, approximately 10 percent of the residual oil is recovered from the formation.

The above examples clearly indicate that when operating in accordance with this invention substantial and economical recovery of the residual oil in the formation can be achieved.

While the above examples illustrate the application of caustic leach for the humic acid surfactant, similar results would likewise be achieved by use of the other leaching techniques and mediums above described. The selection of the particular medium is dependent upon the composition of the oil-bearing formation and the particular source of humic acid to be employed in generating the surfactant.

Reasonable variations and modifications are possible within the scope of the foregoing disclosure, and the appended claims to the invention.

I claim:

1. In a secondary recovery process in which at least one injection well and at least one producing well penetrate an oil-bearing formation and an aqueous flooding medium is introduced into said oil-bearing formation through said injection well and in which recovered oil is removed through said producing well, the improvement which comprises introducing humic acid as surfactant to change the wettability characteristics of said oil-bearing formation by mixing said humic acid with said flooding medium.

2. A process according to claim 1 wherein said humic acid is leached from a formation containing same prior to its introduction into said aqueous flooding medium.

3. A process according to claim 1 wherein said humic acid is added to said aqueous flooding medium prior to its introduction into said oil-bearing formation.

4. A process according to claim 1 wherein said humic acid is leached from the formation by said aqueous flooding medium so as to form in situ a surfactant containing aqueous flooding medium in the formation as the aqueous flooding medium is introduced thereto.

References Cited

UNITED STATES PATENTS

| | | | |
|---|---|---|---|
| 2,560,930 | 7/1951 | Campise | 252—8.5 |
| 2,783,201 | 2/1957 | Rahn | 252—8.5 |
| 3,160,205 | 12/1964 | Harvey et al. | 166—9 |
| 3,270,808 | 9/1966 | Harvey | 166—9 |

FOREIGN PATENTS

| | | |
|---|---|---|
| 551,234 | 1/1958 | Canada. |

STEPHEN J. NOVOSAD, *Primary Examiner.*